United States Patent
Nagasaki et al.

(10) Patent No.: US 6,923,402 B2
(45) Date of Patent: Aug. 2, 2005

(54) TAPE GUIDE POST MECHANISM

(75) Inventors: Eiji Nagasaki, Osaka (JP); Akio Konishi, Hyogo (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 10/161,402

(22) Filed: May 31, 2002

(65) Prior Publication Data

US 2002/0195517 A1 Dec. 26, 2002

(30) Foreign Application Priority Data

Jun. 25, 2001 (JP) .................................... 2001-190990

(51) Int. Cl.$^7$ ............................................. B65H 23/16
(52) U.S. Cl. ................... 242/615.1; 226/180; 226/194; 226/196.1; 360/95; 360/137
(58) Field of Search ............................. 242/346.1, 615, 242/615.1, 615.3, 157.1; 226/180, 194, 196.1; 360/95, 137

(56) References Cited

U.S. PATENT DOCUMENTS 5,365,386 A * 11/1994 Konishi et al. ............... 360/85
5,369,536 A * 11/1994 Konishi et al. ............... 360/85

* cited by examiner

Primary Examiner—John Q. Nguyen
(74) Attorney, Agent, or Firm—Renner, Otto, Boisselle & Sklar, LLP

(57) ABSTRACT

A tape guide post mechanism for guiding running of a tape includes: a post arm, the post arm including a tape guide post, around which the tape is looped at a predetermined angular distance, and which guides running of the tape, and a hole; an arm shaft which engages with the hole and rotatably supports the post arm, wherein an external side surface of the arm shaft is in contact with the hole at at least two points in the vicinity of an upper opening of the hole and at at least two points in the vicinity of a lower opening of the hole.

10 Claims, 6 Drawing Sheets

(PRIOR ART)

TAPE GUIDE POST MECHANISM

BACKGROUND OF THE INVENTION

1. Field of the Invention

The present invention relates to a tape guide post mechanism for use in a magnetic recording/reproducing apparatus, such as a videotape recorder (VTR).

2. Description of the Related Art

In recent years, there has been a growing demand for decreases in size and cost of magnetic recording/reproduction apparatus, such as VTRs, camcorders, etc.

Hereinafter, a tape guide post mechanism for use in a conventional magnetic recording/reproducing apparatus is described.

FIG. 6 is a plan view of a magnetic recording/reproducing apparatus which uses a conventional tape guide post mechanism. FIG. 6 shows that a tape 2 has been pulled out from a cassette 1 by tape guide posts 8, 9, 10, and 13, and looped around a rotatable head cylinder 6. In this state, recording/reproduction of data or information to/from the tape 2 can be performed. In FIG. 6, some parts are omitted (i.e., not shown) for clarity of illustration.

As shown in FIG. 6, the tape 2 is wound around an S-reel 4a and a T-reel 5a stored in the cassette 1. For clarity of illustration, the external shape of the cassette 1 is represented by a dashed line. Reference numeral 3 denotes a base of a magnetic recording/reproducing apparatus, on which the cassette 1 is mounted. Reference numeral 4 denotes an S-reel bed, which is rotatably and axially supported on the base 3. The S-reel bed 4 is engaged, and rotates integrally, with the S-reel 4a.

Reference numeral 5 denotes a T-reel bed, which is rotatably and axially supported on the base 3. The T-reel bed 5 is engaged, and rotates integrally, with the T-reel 5a. Reference numeral 15 denotes a tension arm (post arm). The tension arm 15 has: a tension post 8, which is one of the tape guide posts, and which is one of the constituent elements of a tape running system; and a hole 15a. The base 3 has a tension arm shaft 14, which is provided so as to penetrate through the hole 15a, so that the tension arm shaft 14 rotatably supports the tension arm 15. Reference numeral 18 denotes a tension band, one end of which is supported by a shaft 15b formed in the tension arm 15, and the other end which is fixed to the base 3 with a band fixture screw 19. The intermediate portion of the tension band 18 is wound around a cylindrical portion 20 of the S-reel bed 4. The tension arm 15 is urged by an urging spring 15a around the tension arm shaft 14 in a counterclockwise direction.

Reference numeral 6 denotes a rotatable head cylinder provided on the base 3. The rotatable head cylinder 6 has a rotatable magnetic head, through which a signal is recorded in/reproduced from the tape 2 that is looped around the rotatable head cylinder 6. Reference numeral 7 denotes a S1-post, which is one of the tape guide posts. Reference numeral 11 denotes a T1-post, which is one of the tape guide posts. The S1-post 7 and the T1-post 11 are fixed to the base 3, and are constituent elements of the tape running system. Reference numeral 9 denotes a S2-post, which is one of the tape guide posts. Reference numeral 10 denotes a T2-post, which is one of the tape guide posts. The S2-post 9 and the T2-post 10 are constituent elements of the tape running system. Reference numeral 12 denotes a capstan shaft, and reference numeral 100 denotes a pinch roller. The tape 2 which is sandwiched by the capstan shaft 12 and the pinch roller 100 is driven in a forward/reverse direction by forward/reverse rotation of the capstan shaft 12. Reference numeral 13 denotes a T3-post, which is one of the tape guide posts, and is a constituent element of the tape running system. The T3-post 13 is formed in a T3-arm 17 which is a post arm. The T3-arm 17 has a hole 17a. A T3-arm shaft 23a which is formed on the base 3 is provided so as to penetrate through the hole 17a, so that the T3-arm shaft 23a rotatably supports the T3-arm 17. FIG. 6 shows that the tape 2 has been pulled out of the cassette 1 by the tension post 8, the S1-post 9, the T1-post 10, and the T3-post 13, which are driven by driving means not shown in FIG. 6.

The tape running system shown in FIG. 6 is now described. The tape 2 pulled out from the S-reel 4a is first looped around the S2-post 7 on the base 3, and then, looped around the tension post 8 and the S1-post 9. Further, the tape 2 is looped around the rotatable head cylinder 6, and around the T1-posts 10 and the T2-posts 11. Thereafter, the tape 2 is looped around the capstan shaft 12 and the T3-post 13. Thereafter, the tape 2 is wound around the T-reel 5a.

Hereinafter, an operation of the tape guide post mechanism of the conventional magnetic recording/reproducing apparatus having the above described structure is described with reference to FIGS. 7 through 9.

FIG. 7 is a cross-sectional view showing the T3-arm 17 of the conventional tape guide post mechanism. FIG. 8 is a cross-sectional view showing the state of the T3-arm 17 when a tape tension is applied to the T3-arm 17. FIG. 9 is a perspective view showing the details about engagement between the hole 17a of the T3-arm 17 and the T3-arm shaft 23a.

In FIG. 7, the tape 2 is not looped around the T3-post 13. The hole 17a of the T3-arm 17 is rotatably engaged with the T3-arm shaft 23 a formed on the base 3. The T3-arm 17 is prevented by a stoppage ring 21 from being upwardly disengaged from the T3-arm shaft 23a. Further, some space 22 is necessarily provided between the internal wall surface of the hole 17a and the external side surface of the T3-arm shaft 23a such that the T3-arm 17 is rotatable around the T3-arm shaft 23a.

When the tape 2 is looped around the T3-post 13 so as to have a predetermined contact area therebetween which corresponds to a predetermined angular distance around the T3-post 13 so that the tape 2 can run, tape tension Ta is applied to the T3-post 13 as shown in FIG. 8. Due to tape tension Ta, a rotation moment is caused in the T3-arm 17 and the T3-post 13 in the direction of arrow M. Accordingly, the T3-arm 17 slightly rotates in the direction of arrow M as shown in FIG. 8. As a result, the internal wall surface of the hole 17a of the T3-arm 17 is in contact with the external side surface of the T3-arm shaft 23a at an upper contact point 30 and a lower contact point 31 as shown in FIG. 9.

FIG. 9 shows the slanted T3-arm 17 only in the vicinity of the T3-arm shaft 23a. As seen from FIG. 9, a hole centerline 33 between the center of the upper opening of the hole 17a of the T3-arm 17 ("upper hole center 32a") and the center of the lower opening of the hole 17a of the T3-arm 17 ("lower hole center 32b") is slanted with respect to the longitudinal axis of the T3-arm shaft 23a. Herein, the T3-post 13 is a constituent element of the tape running system. The amount and direction of slant of the T3-post 13 must be accurately determined.

However, in the above conventional structure, there are problems as described below with reference to FIGS. 8 and 9. Due to small, external disturbing factors, such as a variation of tape tension Ta, a variation of friction force generated between the T3-post 13 and the tape 2, etc., the position of the upper contact point 30 unstably shifts in a direction indicated by arrow B of FIG. 9, and the position of the lower contact point 31 unstably shifts along a direction indicated by arrow C of FIG. 9. That is, the slant of the hole center line 33 with respect to the axis of the T3-arm shaft 23a is varied, and the amount and direction of slant of the T3-post 13 are unstable. Also, shift of the positions of the upper contact point 30 and the lower contact point 31 is caused by the attitude change or vibration of the magnetic recording/reproducing apparatus, and as a result, the amount and direction of slant of the T3-post 13 are unstable.

Furthermore, the magnitude and direction of the force applied to the T3-post 13 due to the tape tension are different between a case where the tape 2 runs in a forward direction and a case where the tape 2 runs in a reverse direction. Thus, when the running direction of the tape 2 changes between the forward and reverse directions, the positions of the upper contact point 30 and the lower contact point 31 shift, so that the amount and direction of slant of the T3-post 13 are unstable. As described above, in the conventional structure, the amount and direction of slant of the T3-post 13 are essentially and necessarily unstable because of the attitude change or vibration of the magnetic recording/reproducing apparatus, a change in the running state of the tape 2, such as the running direction of the tape 2, the tape tension, or the like.

SUMMARY OF THE INVENTION

According to one aspect of the present invention, a tape guide post mechanism for guiding running of a tape, includes: a post arm, the post arm including a tape guide post, around which the tape is looped at a predetermined angular distance, and which guides running of the tape, and a hole; an arm shaft which engages with the hole and rotatably supports the post arm, wherein an external side surface of the arm shaft is in contact with the hole at at least two points in the vicinity of an upper opening of the hole and at at least two points in the vicinity of a lower opening of the hole.

In one embodiment of the present invention, the external side surface of the arm shaft has a cylindrical shape; and an internal wall surface of the hole of the post arm does not have a cylindrical shape.

In another embodiment of the present invention, the external side surface of the arm shaft does not have a cylindrical shape; and an internal wall surface of the hole of the post arm has a cylindrical shape.

In still another embodiment of the present invention, the internal wall surface of the hole of the post arm has a polygonal shape.

In still another embodiment of the present invention, the internal wall surface of the hole of the post arm has a hexagonal shape.

In still another embodiment of the present invention, the external side surface of the arm shaft has a polygonal shape.

In still another embodiment of the present invention, the external side surface of the arm shaft has a hexagonal shape.

In still another embodiment of the present invention, the internal wall surface of the hole of the post arm has a different shape at the upper opening and the lower opening of the hole.

According to another aspect of the present invention, a tape guide post mechanism for guiding running of a tape includes: a post arm, the post arm including a tape guide post, around which the tape is looped at a predetermined angular distance, and which guides running of the tape, and a hole; an arm shaft which engages with the hole and rotatably supports the post arm, wherein an external side surface of the arm shaft has a first shape and an internal wall surface of the hole of the post arm has a second shape which is different from the first shape.

In one embodiment of the present invention, one of the first shape and the second shape is cylindrical, and the other of the first shape and the second shape is non-cylindrical.

According to the present invention, a simply structured, inexpensive tape guide post mechanism can be obtained, where a slant of a tape guide post does not vary even in the presence of the attitude change or vibration of the magnetic recording/reproducing apparatus, a change in the running state of a tape, such as the running direction of the tape, the tape tension, or the like.

According to the present invention, a jolt between an arm shaft and a hole formed in a post arm may be avoided, while the arm shaft may be rotatably engaged with the post arm. As a result, a simply structured, in expensive tape guide post mechanism can be realized, where a slant of the longitudinal center line of the arm shaft with respect to the longitudinal axis of the hole of the arm post rarely varies.

According to the present invention, an external side surface of the arm shaft has a cylindrical shape, while an internal wall surface of the hole of the post arm does not have a cylindrical shape. With such a simple and less expensive contrivance, the external side surface of the arm shaft is in contact with the hole at two points in the vicinity of an upper opening of the hole and at two points in the vicinity of a lower opening of the hole. Due to such an arrangement, a jolt between the arm shaft and the hole formed in the post arm is avoided, while the arm shaft can be rotatably engaged with the post arm. As a result, a simply structured, inexpensive tape guide post mechanism can be realized, where slant of the longitudinal center line of the arm shaft with respect to the longitudinal axis of the hole of the arm post rarely varies.

According to the present invention, an external side surface of the arm shaft does not have a cylindrical shape, while an internal wall surface of the hole of the post arm has a cylindrical shape. Therefore, the external side surface of the arm shaft is in contact with the hole at two points in the vicinity of an upper opening of the hole and at two points in the vicinity of a lower opening of the hole. Due to such an arrangement, a jolt between the arm shaft and the hole formed in the post arm is avoided, while the arm shaft can be rotatably engaged with the post arm. As a result, again a simply structured, inexpensive tape guide post mechanism can be realized, where a slant of the longitudinal center line of the arm shaft with respect to the longitudinal axis of the hole of the arm post rarely varies.

Thus, the invention described herein makes possible the advantages of providing a simply structured, inexpensive tape guide post mechanism where the slant of a tape guide post does not vary even in the presence of the attitude change or vibration of the magnetic recording/reproducing apparatus, a change in the running state of a tape, such as the running direction of the tape, the tape tension, or the like.

These and other advantages of the present invention will become apparent to those skilled in the art upon reading and understanding the following detailed description with reference to the accompanying figures.

DESCRIPTION OF THE PREFERRED EMBODIMENTS

Hereinafter, embodiments of the present invention will be described with reference to the drawings.
(Embodiment 1)

Figure 1:
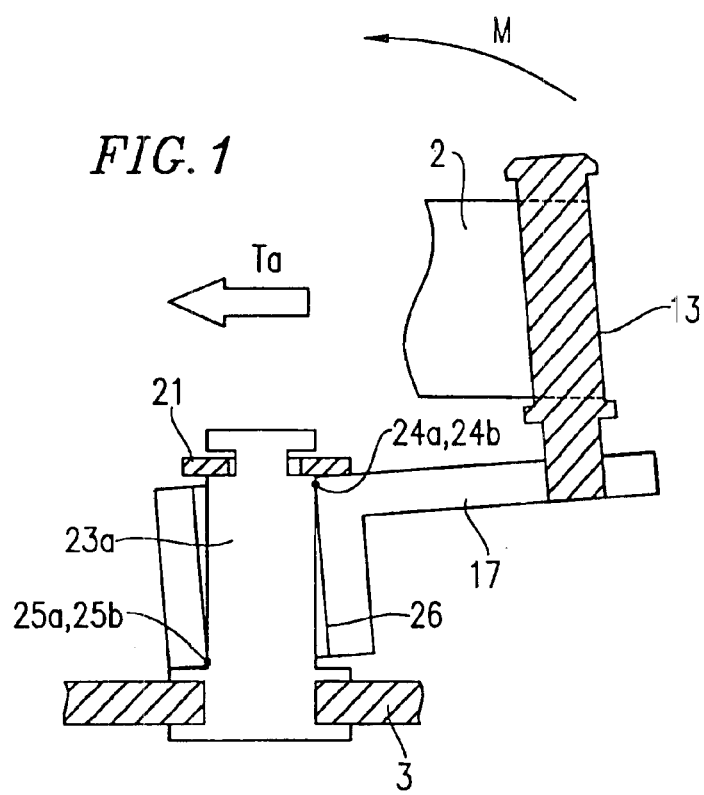
FIG. 1 is a cross-sectional view of a tape guide post mechanism according to embodiment 1 of the present invention.
Figure 2:
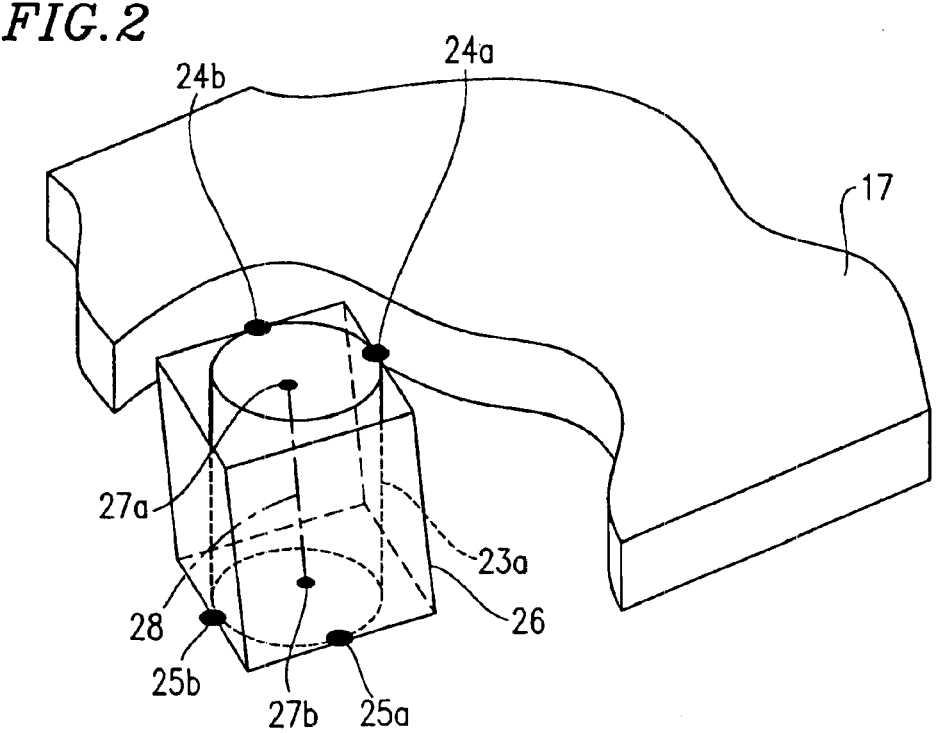
FIG. 2 is a perspective view showing in detail engagement between a hole and a shaft in the tape guide post mechanism according to embodiment 1.

FIG. 1 is a cross-sectional view of a tape guide post mechanism according to embodiment 1 of the present invention. FIG. 2 is a perspective view showing in detail the engagement between a hole and a shaft in the tape guide post mechanism according to embodiment 1. The structure and operation of a magnetic recording/reproducing apparatus which uses the tape guide post apparatus of embodiment 1 are the same as those of the above-described conventional magnetic recording/reproducing apparatus, except for the T3-arm 17 and relevant elements thereof. Thus, only the T3-arm 17 and the relevant elements thereof are described below with reference to FIGS. 1 and 2.

In FIGS. 1 and 2, reference numeral 17 denotes the T3-arm, which is a post arm. Reference numeral 13 denotes a T3-post for guiding the tape 2. The T3-post 13 is combined with the T3-arm 17, so that they work as a single integral element. Reference numeral 26 denotes a hole formed in the T3-arm 17. In this embodiment, the internal wall surface of the hole 26 is not a cylindrical shape but the shape of a square pole. Reference numeral 23a denotes a T3-arm shaft formed on the base 3, the external side surface of which has a cylindrical shape. The T3-arm shaft 23a extends through the hole 26 of the T3-arm 17 and rotatably supports the T3-arm 17. Reference numeral 21 denotes as top page ring for preventing the T3-arm 17 from being upwardly disengaged from the T3-arm shaft 23a. In FIG. 2, the stop page ring 21 and the base 3 are omitted.

An operation of the tape guide post mechanism of embodiment 1 having the above structure is described with reference to FIGS. 1 and 2.

When the tape 2 is looped around the T3-post 13 so as to have a predetermined contact area therebetween which corresponds to a predetermined angular distance around the T3-post 13, tape tension Ta is applied to the T3-post 13 as shown in FIG. 1. Due to tape tension Ta, a rotation moment is caused in the T3-post 13 in the direction of arrow M. Accordingly, the T3-arm 17 slightly rotates in the direction of arrow M as shown in FIG. 1. As a result, the external side surface of the T3-arm shaft 23a is in contact with the square, non-cylindrical internal wall surface of the hole 26 of the T3-arm 17 at four points, i.e., at upper contact points 24a and 24b and lower contact points 25a and 25b as shown in FIG. 2. Due to this four-point contact, the axial center line 28 of the hole 26 between the center of the upper opening of the hole 26 ("upper hole center 27a") and the center of the lower opening of the hole 26 ("lower hole center 27b") is kept at a constant slant with respect to the longitudinal axis of the T3-arm shaft 23a.

As described above, according to embodiment 1, the external side surface of the T3-arm shaft 23a is a cylindrical shape, and the internal wall surface of the hole 26 of the T3-arm 17 is not a cylindrical shape but the shape of a square pole. Thus, when the axis of the T3-arm shaft 23a is slanted with respect to the longitudinal axis of the hole 26, the T3-arm shaft 23a is in contact with the hole 26 of the T3-arm 17 at the two upper contact points and the two lower contact points. Due to such an arrangement, the occurrence of a jolt between the T3-arm shaft 23a and the hole 26 of the T3-arm 17 is avoided. Thus, a simply structured, inexpensive tape guide post mechanism can be realized, where a slant of the longitudinal center line of the T3-arm shaft 23a with respect to the longitudinal axis of the hole 26 of the T3-arm 17 rarely varies even in the presence of the attitude change or vibration of the magnetic recording/reproducing apparatus, a change in the running state of a tape, such as the running direction of the tape, the tape tension, or the like.

(Embodiment 2)

The structure and operation of a magnetic recording/reproducing apparatus which uses the tape guide post apparatus of embodiment 2 are the same as those of embodiment 1 and the above-described conventional magnetic recording/reproducing apparatus, except for the T3-arm 17 and relevant elements thereof. Thus, only the T3-arm 17 and the relevant elements thereof are described below with reference to FIGS. 3 and 4.

Figure 3:
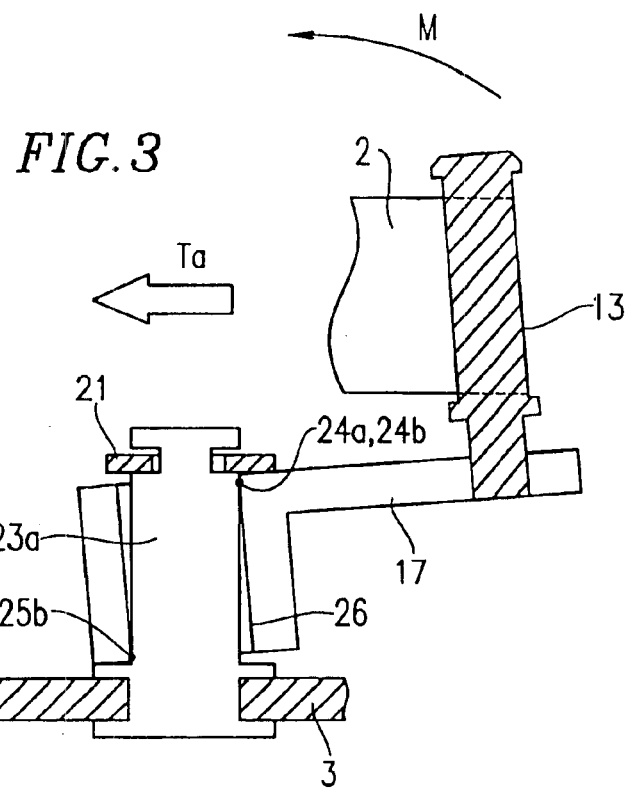
FIG. 3 is a cross-sectional view of a tape guide post mechanism according to embodiment 2 of the present invention.
Figure 4:
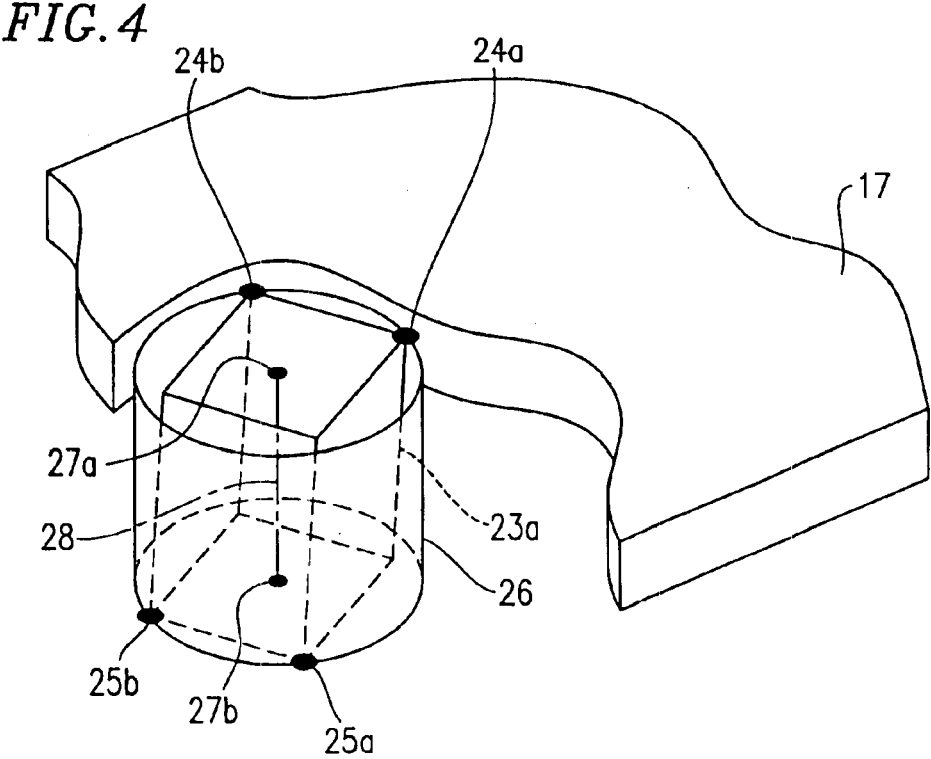
FIG. 4 is a perspective view showing in detail engagement between a hole and a shaft in the tape guide post mechanism according to embodiment 2.

FIG. 3 is a cross-sectional view of a tape guide post mechanism according to embodiment 2 of the present invention. FIG. 4 is a perspective view showing the details about engagement between a hole and a shaft in the tape guide post mechanism according to embodiment 2.

In FIGS. 3 and 4, reference numeral 17 denotes the T3-arm, which is a post arm. Reference numeral 13 denotes a T3-post for guiding the tape 2. The T3-post 13 is combined with the T3-arm 17, so that they work as a single integral element. Reference numeral 26 denotes a hole formed in the T3-arm 17, the internal wall surface of which is a cylindrical shape. Reference numeral 23a denotes a T3-arm shaft formed on the base 3, the external side surface of which is not a cylindrical shape but rather the shape of a square pole. The T3-arm shaft 23a extends through the hole 26 of the T3-arm 17 and rotatably supports the T3-arm 17. Reference numeral 21 denotes a stoppage ring for preventing the T3-arm 17 from being upwardly disengaged from the T3-arm shaft 23a. In FIG. 4, the stop page ring 21 and the base 3 are omitted.

An operation of the tape guide post mechanism of embodiment 2 having the above structure is described with reference to FIGS. 3 and 4.

When the tape 2 is looped around the T3-post 13 so as to have a predetermined contact area therebetween which corresponds to a predetermined angular distance around the T3-post 13, tape tension Ta is applied to the T3-post 13 as shown in FIG. 3. Due to tape tension Ta, a rotation moment is caused in the T3-post 13 in the direction of arrow M. Accordingly, the T3-arm 17 slightly rotates in the direction of arrow M as shown in FIG. 3. As a result, the external side surface of the T3-arm shaft 23a is in contact with the internal wall surface of the hole 26 of the T3-arm 17 at four points, i.e., at upper contact points 24a and 24b and lower contact points 25a and 25b as shown in FIG. 4. Due to this four-point contact, the axial center line 28 of the hole 26 between the center of the upper opening of the hole 26 ("upper hole center 27a") and the center of the lower opening of the hole 26 ("lower hole center 27b") is kept at a constant slant with respect to the longitudinal axis of the T3-arm shaft 23a.

As described above, according to embodiment 2, the external side surface of the T3-arm shaft 23a is not a cylindrical shape but the shape of a square pole, and the internal wall surface of the hole 26 of the T3-arm 17 has a cylindrical shape. Thus, when the axis of the T3-arm shaft 23a is slanted with respect to the longitudinal axis of the hole 26, the T3-arm shaft 23a is in contact with the hole 26 of the T3-arm 17 at the two upper contact points and the two lower contact points. Due to such an arrangement, occurrence of jolt between the T3-arm shaft 23a and the hole 26 of the T3-arm 17 is avoided. Thus, a simply structured, inexpensive tape guide post mechanism, where slant of the longitudinal center line of the T3-arm shaft 23a with respect to the hole 26 of the T3-arm 17 is rarely varied even in the presence of the attitude change or vibration of the magnetic recording/reproducing apparatus, a change in the running state of a tape, such as the running direction of the tape, the tape tension, or the like, can be realized.

In embodiment 1, the hole 26 of the T3-arm 17 has the shape of a square pole for the clarity of explanation, but the shape of the hole 26 is not limited thereto. The hole 26 may have any shape so long as the T3-arm shaft 23a is in contact with the hole 26 at at least two upper contact points and at least two lower contact points. For example, the hole 26 may have the shape of a hexagonal or other polygonal shaped pole.

Figure 5:
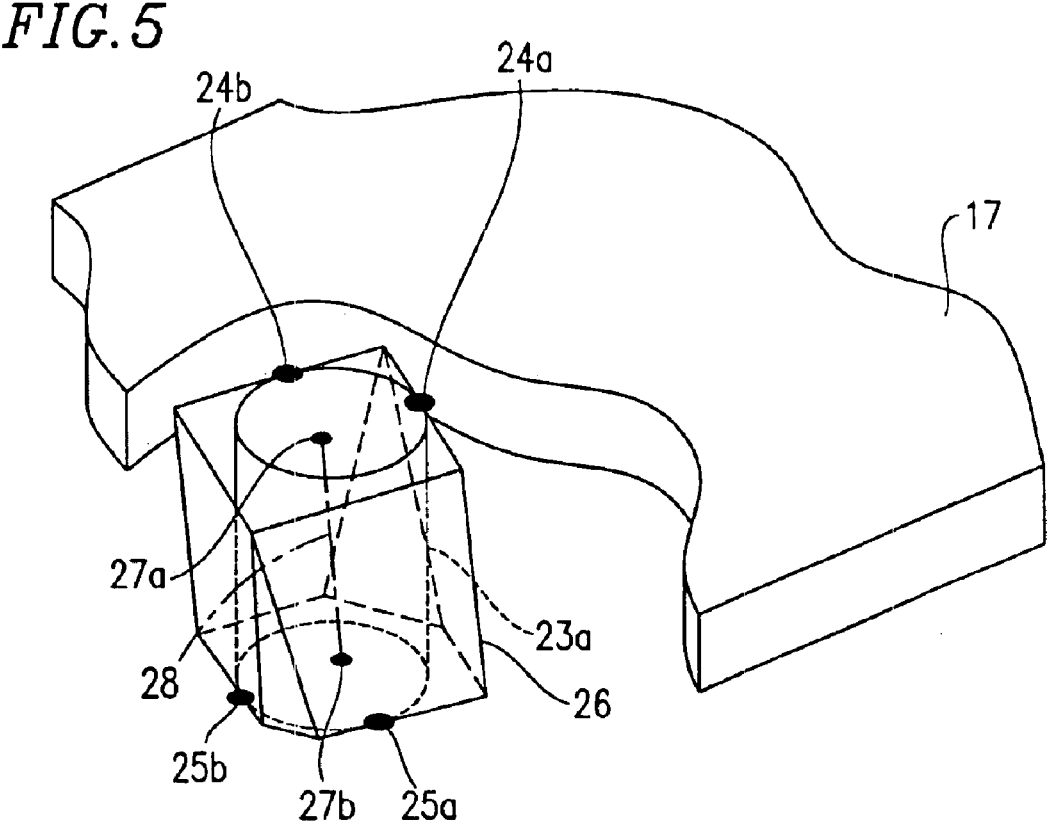
FIG. 5 is a perspective view showing in detail engagement between a hole and a shaft in the tape guide post mechanism according to still another embodiment of the present invention.
Figure 6:
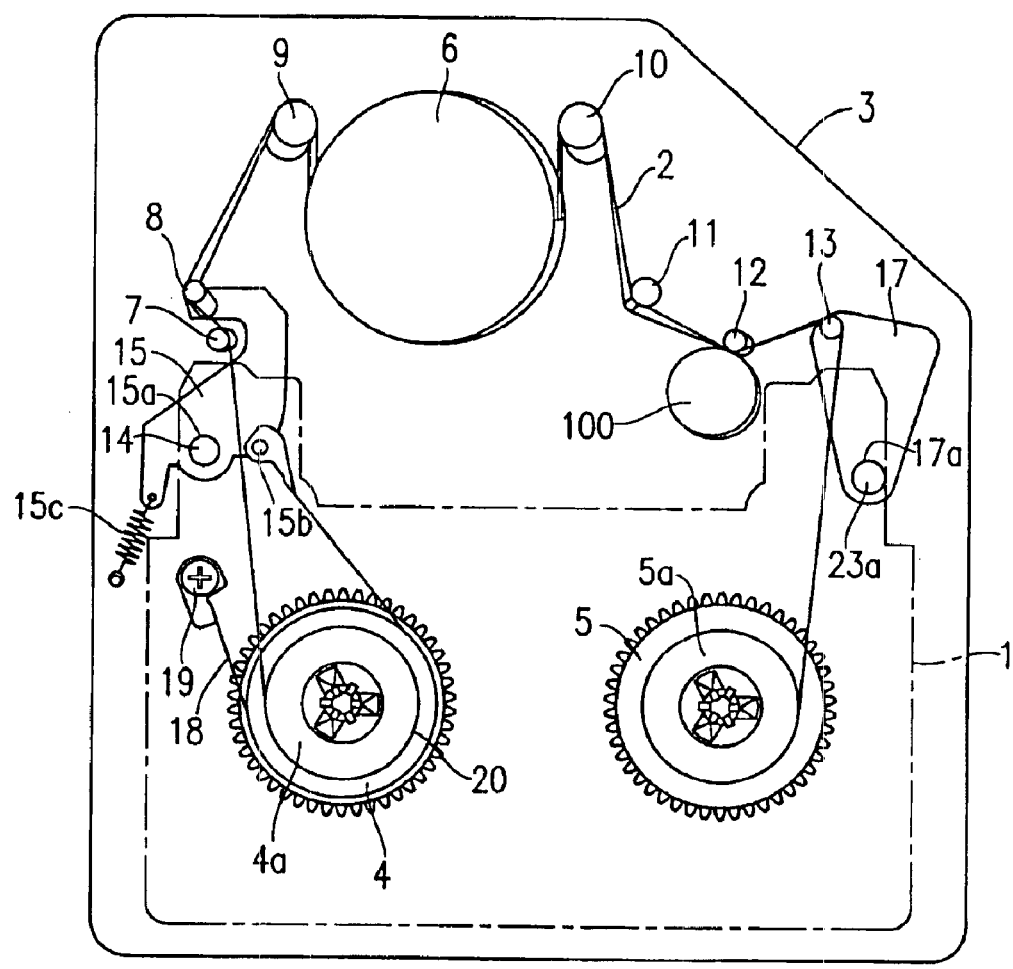
FIG. 6 is a plan view of a magnetic recording/reproducing apparatus which uses a conventional tape guide post mechanism.
Figure 7:
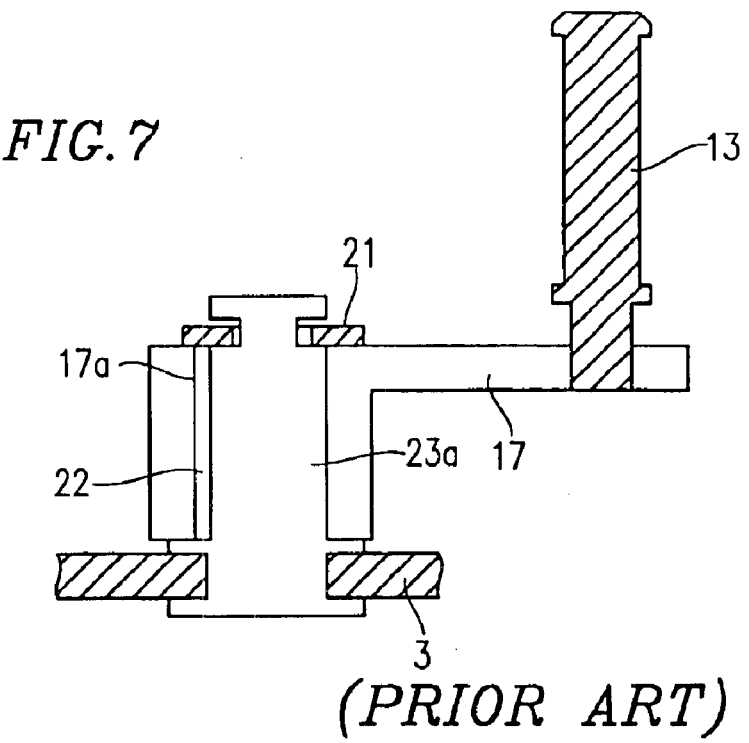
FIG. 7 is a cross-sectional view showing a T3-arm of the conventional tape guide post mechanism.
Figure 8:
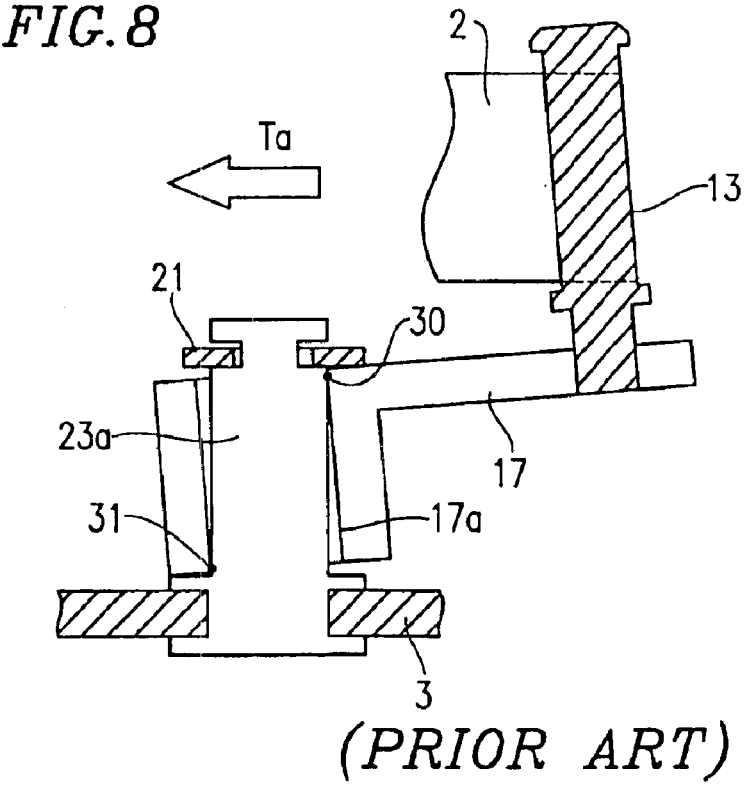
FIG. 8 is across-sectional view showing the state of the T3-arm of the conventional tape guide post mechanism when a tape tension is applied to the T3-arm.
Figure 9:
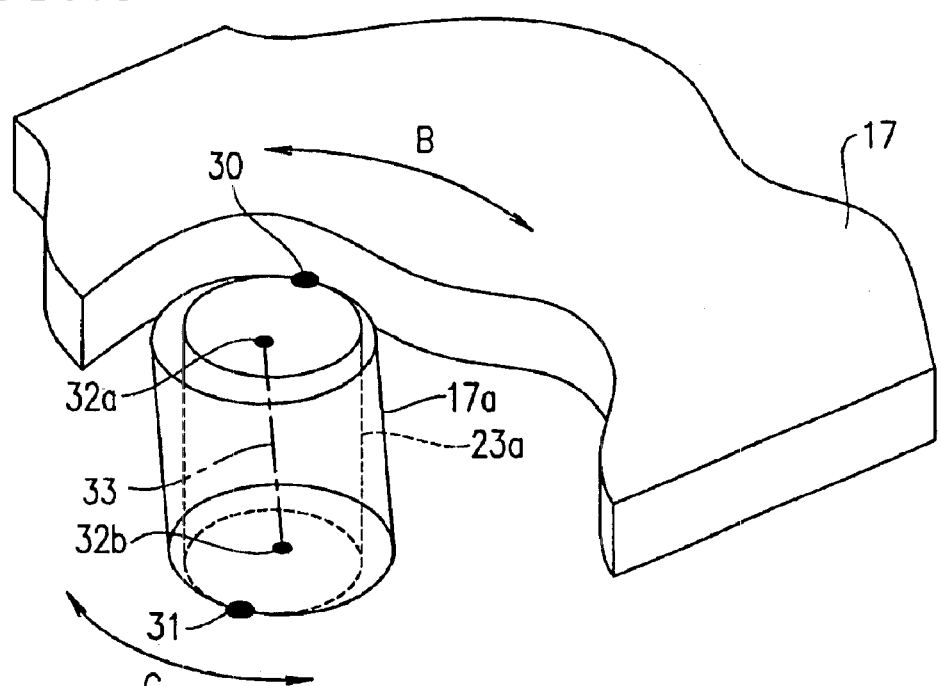
FIG. 9 is a perspective view showing the details about engagement between a hole of the T3-arm and a T3-arm shaft in the conventional tape guide post mechanism.

In embodiment 1, the upper and lower openings of the hole 26 have the same square shape. However, according to the present invention, it is not necessary to form the hole 26 such that the upper and lower openings have the same shape. FIG. 5 shows still another embodiment of the present invention. In FIG. 5, the upper opening of the hole 26 has a square shape, and the lower opening of the hole 26 has a hexagonal shape.

In embodiment 2, the T3-arm shaft 23a has the shape of a square pole for the clarity of explanation, but the shape of the T3-arm shaft 23a is not limited thereto. The T3-arm shaft 23a may have any shape so long as the T3-arm shaft 23a is in contact with the hole 26 at at least two upper contact points and at least two lower contact points. For example, the T3-arm shaft 23a may have the shape of a hexagonal or other polygonal shaped pole.

As described above, a simply structured, inexpensive tape guide post mechanism can be obtained, where slant of a tape guide post is not varied even in the presence of the attitude change or vibration of the magnetic recording/reproducing apparatus, a change in the running state of a tape, such as the running direction of the tape, the tape tension, or the like.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A tape guide post mechanism for guiding running of a tape, comprising:
    a post arm, the post arm including
        a tape guide post, around which the tape is looped at a predetermined angular distance, and which guides running of the tape, and
        a hole;
    an arm shaft which engages with the hole and rotatably supports the post arm,
    wherein when the tape is looped at the predetermined angular distance around the tape guide post, a tape tension is applied to the tape guide post which causes the axis of the arm shaft to be slanted with respect to the longitudinal axis of the hole,
    an external side surface of the arm shaft is in contact with the hole at at least two separate points in the vicinity of an upper opening of the hole and at at least two separate points in the vicinity of a lower opening of the hole, and
    the at least two separate points in the vicinity of the upper opening and the at least two separate points in the vicinity of the lower opening of the hole are diagonally opposite each other.

2. A tape guide post mechanism according to claim 1, wherein:

the external side surface of the arm shaft has a cylindrical shape; and an internal wall surface of the hole of the post arm which contacts the external side surface of the arm shaft does not have a cylindrical shape.

3. A tape guide post mechanism according to claim 2, wherein the internal wail surface of the hole of the post arm which contacts the external side surface of the arm shaft has a different shape at the upper opening and the lower opening of the hole.

4. A tape guide post mechanism according to claim 2, wherein the internal wall surface of the hole of the post arm which contacts the external side surface of the arm shaft has a polygonal shape.

5. A tape guide post mechanism according to claim 4, wherein the internal wall surface of the hole of the post arm which contacts the external side surface of the arm shaft has a hexagonal shape.

6. A tape guide post mechanism according to claim 1, wherein:

the external side surface of the arm shaft does not have a cylindrical shape; and an internal wall surface of the hole of the post arm which contacts the external side surface of the arm shaft has a cylindrical shape.

7. A tape guide post mechanism according to claim 6, wherein the external side surface of the arm shaft has a polygonal shape.

8. A tape guide post mechanism according to claim 7, wherein the external side surface of the arm shaft has a hexagonal shape.

9. A tape guide post mechanism for guiding running of a tape, comprising:

a post arm, the post arm including a tape guide post, around which the tape is looped at a predetermined angular distance, and which guides running of the tape, and a hole;

an arm shaft which engages with the hole and rotatably supports the post arm, wherein when the tape is looped at the predetermined angular distance around the tape guide post, a tape tension is applied to the tape guide post which causes the axis of the arm shaft to be slanted with respect to the longitudinal axis of the hole, an external side surface of the arm shaft is in contact with the hole at at least two separate points in the vicinity of an upper opening of the hole and at at least two separate points in the vicinity of a lower opening of the hole;

the at least two separate points in the vicinity of the upper opening and the at least two separate points in the vicinity of the lower opening of the hole are diagonally opposite each other; and the external side surface of the arm shaft has a first shape and an internal wall surface of the hole of the post arm which contacts the external side surface of the arm shaft has a second polygonal shape which is different from the first shape.

10. A tape guide post mechanism according to claim 9, wherein one of the first shape and the second shape is cylindrical, and the other of the first shape and the second shape is non-cylindrical.

* * * * *

UNITED STATES PATENT AND TRADEMARK OFFICE
CERTIFICATE OF CORRECTION

PATENT NO.    : 6,923,402 B2
DATED         : August 2, 2005
INVENTOR(S)   : Eiji Nagasaki and Akio Konishi It is certified that error appears in the above-identified patent and that said Letters Patent is hereby corrected as shown below:

Column 9,
Line 11, "wail" should read -- wall --.

Signed and Sealed this

Sixth Day of December, 2005

JON W. DUDAS
*Director of the United States Patent and Trademark Office*